Oct. 2, 1956 — W. S. JOSEPHSON — 2,765,204
SEALING DEVICE
Filed Nov. 5, 1954

United States Patent Office 2,765,204
Patented Oct. 2, 1956

2,765,204

SEALING DEVICE

Walter S. Josephson, Schwenksville, Pa., assignor to Greene, Tweed & Co., North Wales, Pa., a corporation of New York Application November 5, 1954, Serial No. 467,087

1 Claim. (Cl. 309—23)

The present invention relates generally to sealing devices, and more particularly to improvements in sealing devices of the kind disclosed in United States Letters Patent No. 2,349,170, issued May 16, 1944, to Elmer F. Jackman, for sealing the circumferential clearance between two interfitting circular parts, such as, for example, the circumferential clearance between a piston and a cylinder.

In sealing devices of the described character for sealing the annular clearance between two telescoping or interfitting circular members, one of the members having an annular groove therein while the other member has a cylindrical surface overlying the groove, a resilient sealing ring of rubber-like material extends from sealing engagement with the bottom of the groove into sealing engagement with the overlying cylindrical surface, the sealing ring having a relatively wide base in the groove and a relatively narrow web extending therefrom into sealing engagement with the cylindrical surface, and blocking rings, which are resilient but harder than the sealing ring, are disposed in the groove at opposite sides of the sealing ring web and are engageable by the radially outer surface of the relatively wide base to be urged radially outward by the latter into contact with the cylindrical surface in response to the action of a pressure fluid in the clearance against the web of the sealing ring so that the blocking rings then prevent extrusion of the sealing ring axially into the clearance.

It is apparent that the effectiveness of the seal requires the provision of a certain minimum "squeeze," that is, an adequate interference between the rubber-like sealing ring in the groove of the one member and the cylindrical surface of the other member. However, it has been found that, in dimensioning the sealing ring to provide the required minimum "squeeze," the normal manufacturing tolerances in the dimensions of the groove, the sealing and blocking rings and the clearance between the interfitting members can result in a condition wherein the maximum volume of the packing, that is, of the sealing and blocking rings, is substantially greater than the maximum volume of the packing space, which is the space defined by the bottom and side wall surfaces of the groove as well as the radial extension of groove defined by the clearance between the interfitting members. Such a condition is undesirable in that it tends to jam the packing and to prevent the normal coaction between the sealing and blocking rings thereof. If an attempt is made to avoid the above described condition by reducing the axial width of the web portion of the sealing ring, the axial clearance between the web portion and the blocking rings can become excessive, while maintaining the normal manufacturing tolerances, and this excessive axial clearance will permit the web portion of the sealing ring to lay-over or cant within the groove between the blocking rings and may cause leakage.

Accordingly, it is the primary object of the present invention to form the sealing ring of a sealing device of the described character so that effective sealing will be obtained under all conditions realized within the manufacturing tolerances, while avoiding the possibility that the packing volume will exceed the volume of the packing space.

Another object is to form the rubber-like sealing ring so that the above primary object will be achieved and, at the same time by reason of the particular configuration of the sealing ring adopted for that purpose, the forming or molding of the sealing ring will be facilitated.

The above, and other objects, features and advantages of the invention apearing in the following detailed description of an illustrative embodiment thereof, are achieved by bevelling, or otherwise cutting away, the edges of the base portion of the sealing ring at the face of the base portion seating against the bottom wall surface of the groove so that, when the manufacturing tolerances result in a maximum packing volume and a minimum volume in the packing space, the rubber-like sealing ring can "flow" into the space left by the cut-away edges of the base portion to avoid jamming of the sealing ring, and so that, when the opposite extreme condition, that is, a minimum packing volume in the packing space, is experienced, the cut-away edges of the sealing ring do not adversely affect the sealing characteristics of the device.

In order that the invention may be fully understood, an illustrative embodiment thereof is hereinafter described in detail and shown in the accompanying drawing, which forms a part hereof and wherein.

Figure 1:
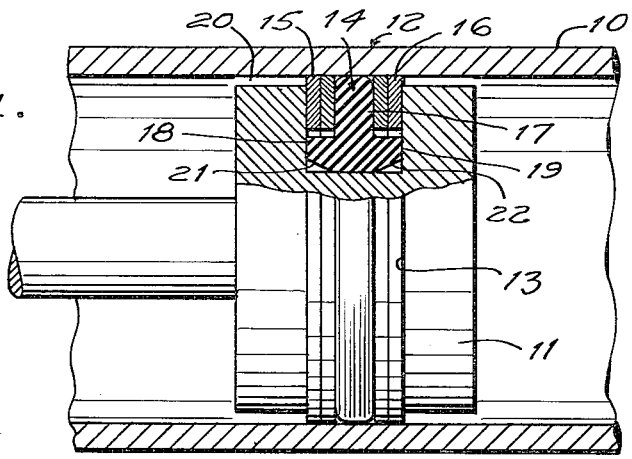
Fig. 1 is a side elevational view, partly broken away and in section, of a sealing device embodying this invention and shown sealing the clearance between a cylinder and a piston working in the latter.

Referring to the drawing in detail, and initially to Fig. 1 thereof, a sealing device embodying the present invention is there illustrated in association with a cylinder assembly including a cylinder 10 and a piston 11 reciprocally movable in the latter. The sealing device embodying the present invention is indicated generally by the reference numeral 12 and is arranged to be mounted in an annular groove 13 formed in the surface of piston 11.

Sealing device 12 includes a continuous sealing ring 14 and radially yieldable blocking rings 15 and 16 mounted at the opposite sides of the sealing ring and engaging the internal cylindrical surface of cylinder 10. The sealing ring 14 has a central radially disposed web-portion 17 (Fig. 2) and two oppositely disposed lateral shoulders 18 and 19 which rest in the bottom of the groove 13 of the piston and define a base portion of the sealing ring. The top or radially outer edge of the web portion 17 may be arcuate or crowned to give a relatively narrow edge for contacting the internal cylindrical surface of cylinder 10, thereby to reduce the friction between the sealing ring and the cylinder. Preferably, the sealing ring 14 is formed of a relatively soft rubber-like material which is oil resistant and readily conformable to the configuration of the groove 13 and the inside surface of the cylinder. Although a material which is soft and readily deformable is required for the sealing ring 14 in order to effect good sealing engagement between the piston and the cylinder, such a soft and readily deformable material may be easily extruded into the circumferential clearance 20 between the piston and cylinder by the action of fluid pressure thereagainst. However, the radially yieldable blocking rings 15 and 16 at opposite sides of web portion 17 of the sealing ring are intended to prevent such extrusion of the sealing ring into the circumferential clearance. The radially yieldable blocking rings 15 and 16 are of the same construction and may include at least two split washers or rings at each side of the sealing ring and having their open spaces (not shown) circumferentially displaced with respect to each other to prevent the extrusion of the sealing ring through such open spaces. The split washers making up the blocking rings are of a material having good wearing qualities, the specific nature of the material depending upon the particular application of the invention. Under certain circumstances, phenolic laminated materials or phenol condensation materials are ideally suited for the blocking rings, while fibrous or plastic materials, as well as contain metals and alloys, may be employed in place thereof if required by the particular conditions under which the sealing device is employed. In any case, it is desirable that the blocking rings 15 and 16 be formed of materials possessing durable wearing characteristics and having the property of being radially yieldable and yet substantially non-compressible in a longitudinal direction.

The sealing device 10, to the extent described above, corresponds to that disclosed in the above identified Letters Patent to Elmer F. Jackman, and operates in substantially the same manner. The several views of the drawing show the sealing device in the condition thereof when no pressure, or a relatively low fluid sealing pressure, is acting thereon. Under this condition, the sealing ring 14 is substantially symmetrical with respect to the central or medial line thereof, while the outer circumferential edges of the radially yieldable blocking rings 15 and 16 engage the cylindrical inner surface of cylinder 10 by reason of their own yieldable character. The inner circumferential edges of the blocking rings 15 and 16 are seen to encircle the laterally disposed shoulders 18 and 19 making up the base portion of the sealing ring and, if desired, a slight circumferential gap may be provided between the inner circumferential edges of the blocking rings and the shoulders 18 and 19, although the sealing device may be made without such a gap or clearance. As the fluid sealing pressure is increased, at one side or the other of the sealing device, the increased pressure operates to compress the sealing ring 14 at the opposite side of its central or medial line to cause the sealing ring to conform closely to the contours of the blocking rings, the wall structure of the groove 13 and the inside surface of the cylinder 10 at that opposite side of the central line. That is, the rubber-like material of the sealing ring 14 flows, under the influence of the pressure acting thereagainst, until the laterally disposed shoulder 18 or 19 swells up and engages the inside edges of the radially yieldable blocking rings 15 or 16, respectively, and forceably urges the outside edge of the related blocking ring against the inside surface of cylinder 10. Such forceable engagement of the blocking rings with the inner surface of cylinder 10 ensures that the extrusion of the yieldable sealing ring 14 into the clearance 20 will be prevented, as an increase in the pressure acting axially upon the sealing ring 14 is accompanied by a corresponding increase in the radially outward pressure of the blocking rings opposing extrusion of the sealing ring.

Preferably, the normal or non-deformed radial height of the sealing ring 14, that is, the dimension from the center of the base portion thereof to the crown of the outer edge of the web portion 17, is slightly larger than the corresponding radial dimension between the bottom wall surface of the groove 13 and the inner cylindrical surface of cylinder 10, that is, the combined depth of the groove 13 and the clearance 20, so that, when the sealing device 12 is installed on the piston 11 and the latter is inserted within cylinder 10, the sealing ring 14 is slightly deformed to provide an initial "squeeze" against the inner surface of the cylinder. This slight "squeeze" is required so that, as the fluid pressure at one side or the other of the sealing device is increased, the increased pressure will act only at the confronting side of the ring 14 to ensure the proper operation of the device in the manner described above. However, it has been found that as a result of the normal manufacturing tolerances, the dimensioning of the parts to provide the required "squeeze" under all possible conditions, can result in an extreme condition, that is, when the combined volume of the sealing ring 14 and of the blocking rings 15 and 16 exceeds the packing space defined by the volume of the groove 13 and the radially outward extension thereof defined by the clearance 20, and under this extreme condition, the increased fluid pressure cannot act properly against the confronting side of the sealing ring 14 to produce the desired radially outward movement of the blocking ring at the opposite side of the sealing ring. The above described extreme condition also results in excessive, and undesirable, friction between the sealing device and the inner surface of cylinder 10. If the radial dimension of the sealing ring 14 is decreased in order to prevent the above described extreme condition, the required minimum "squeeze" will not be obtained under the opposite extreme condition within the manufacturing tolerances. Further, if an attempt is made to reduce the width of the web portion 17 of the sealing ring, so that, in the event of excessive "squeeze," the excess material of the web portion 17 can spread axially into the resultant gaps between the web portion and the blocking rings, a condition may be encountered, within the normal manufacturing tolerances, wherein under a normal "squeeze" relatively large gaps exist between the web portions 17 and the adjacent blocking rings 15 and 16 so that the web portion may lay over or cant between the blocking rings and thereby destroy the effectiveness of the seal.

Figure 2:
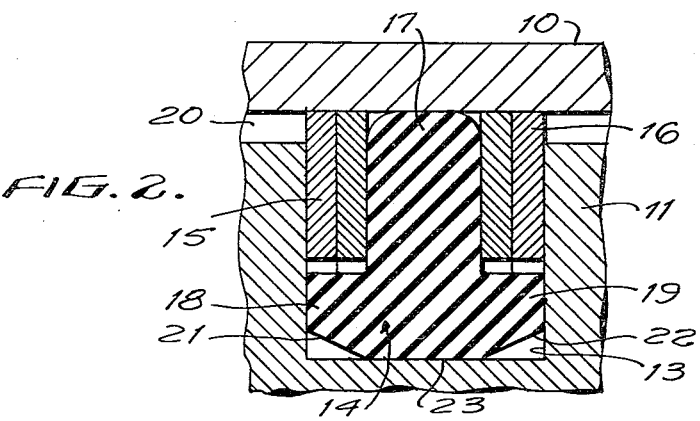
Fig. 2 is an enlarged cross-sectional view of the sealing device of Fig. 1 representing one extreme condition possible within the manufacturing tolerances.

In accordance with the present invention, the possibility, within the normal manufacturing tolerances, of the combined volume of the sealing ring 14 and the blocking rings 15 and 16 exceeding the volume of the space available therefor within the groove 13 is avoided by cutting away portions of the sealing ring 14 at locations where such cutting away will have no adverse effect upon the sealing characteristics of the assembly. Specifically, the edges of the shoulders 18 and 19 defining the base portion of sealing ring 14 are cut away or bevelled, as at 21 and 22 so that the opposite longitudinal edge portions of the surface of the base portion of sealing ring 14 which is engageable with the bottom wall surface of groove 13 are inclined radially away from the bottom surface of the groove (Fig. 2). Preferably, the central flat portion 23 of the surface of sealing ring 14 engageable with the bottom of groove 13 is at least as wide as the web portion 17 of the sealing ring to provide a firm and adequate base for the sealing ring when the latter is "squeezed" between the bottom of the groove and the inner surface of cylinder 10.

Figure 3:
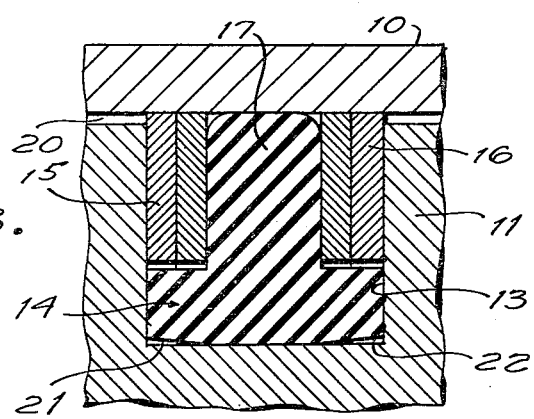
Fig. 3 is a view similar to Fig. 2, but representing the opposite extreme condition possible within the manufacturing tolerances.

Fig. 2 represents one of the extreme conditions possible within the normal manufacturing tolerances, and wherein the combined volume of the sealing and blocking rings is a minimum, while the space within the groove 13 and the clearance 20 for accommodating the sealing and blocking rings is a maximum. On the other hand, Fig. 3 of the drawing represents the opposite extreme condition possible within the manufacturing tolerances, and wherein the packing volume, that is, the combined volume of the sealing ring and the blocking rings, is a maximum, while the space for accommodating the packing or seal within the groove 13 and the clearance 20 is a minimum. It will be seen that, when the extreme condition of Fig. 3 is encountered, the excess material from the web portion 17 of the sealing ring tends to flow towards the opposite sides of the bottom of the groove 13 so that the bevelled or inclined edge portions 21 and 22 of the sealing ring are deformed toward or against the bottom of the groove. It is apparent that the bevelled edge portions 21 and 22 of the sealing ring can be dimensioned so that the resulting spaces provided in the groove are adequate for accommodating any excess of the rubber-like material of ring 14 that may be encountered within the normal manufacturing tolerances for the piston, cylinder and parts of the sealing device.

Since the excess material of the sealing ring 14 is accommodated in the spaces defined by the bevelled edge portions 21 and 22 and the bottom of the groove 13, the width of the web portion 17 and the radial height of the entire sealing ring can be dimensioned so that the web portion seats firmly between the blocking rings 15 and 16 and so that the required "squeeze" is obtained between the web portion 17 and the inner surface of cylinder 10.

Although the invention has been described in connection with an embodiment wherein the sealing device 12 is carried by a movable piston and engages a fixed cylinder, it is apparent that it is not limited to that particular application but can be employed in other applications, for example, where the annular groove is in an outer fixed member and the sealing device in such groove engages the cylindrical surface of a movable shaft, or where the interfitting members are both fixed. It is also to be understood that the present invention is not limited to the particular construction of the embodiment described and illustrated herein, which has been presented merely by way of example, and that various changes and modifications may be effected therein without departing from the scope or spirit of the invention as defined in the appended claim.

What is claimed is:

In a fluid seal for the annular clearance between opposed surfaces of two circular, interfitting members, one of said members having an annular groove of rectangular cross-section and the other of said members having a cylindrical surface opposed to said groove, a rubber-like sealing ring including a base seating in the groove and a central web portion of reduced width extending radially from said base portion out of said groove and into sealing engagement with said cylindrical surface of the other member, and blocking rings at opposite sides of said web portion extending radially from said groove into engagement with said cylindrical surface, the improvement which comprises a right cylindrical central portion on said base portion of a width substantially as large as the width of said web portion to provide adequate support for the sealing ring within the groove, and normally inclined edge portions on said base portion on opposite sides of said central portion which, with the material of said one member defining the bottom corners of the groove, define spaces into which an excess of the rubber-like material of the sealing ring can flow.

References Cited in the file of this patent

UNITED STATES PATENTS

| | | |
|---|---|---|
| 1,531,242 | Miller | Mar. 24, 1925 |
| 1,612,039 | Miller | Dec. 28, 1926 |
| 2,208,620 | Baisch | July 23, 1940 |
| 2,349,170 | Jackman | May 16, 1944 |
| 2,450,693 | Sanders | Oct. 5, 1948 |